United States Patent
Farooq (10) Patent No.: US 6,841,208 B2
(45) Date of Patent: Jan. 11, 2005

(54) INK RECEPTIVE COMPOSITIONS AND ARTICLES FOR IMAGE TRANSFER

(75) Inventor: Omar Farooq, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 166 days.

(21) Appl. No.: 10/347,812

(22) Filed: Jan. 21, 2003

(65) Prior Publication Data

US 2003/0153666 A1 Aug. 14, 2003

Related U.S. Application Data

(60) Division of application No. 09/834,471, filed on Apr. 13, 2001, now abandoned, which is a continuation-in-part of application No. 09/634,413, filed on Aug. 8, 2000, now abandoned.

(51) Int. Cl.$^7$ .................................................. B32B 3/00
(52) U.S. Cl. .................................... 428/32.5; 428/32.39
(58) Field of Search ......................... 428/32.12, 32.39, 428/32.5

(56) References Cited

U.S. PATENT DOCUMENTS

| | | |
|---|---|---|
| 3,944,511 A | 3/1976 | Taylor |
| 3,957,724 A | 5/1976 | Schurb et al. |
| 3,997,702 A | 12/1976 | Schurb et al. |
| 4,119,533 A | 10/1978 | Saitoh et al. |
| 4,313,988 A | 2/1982 | Koshar et al. |
| 4,567,073 A | 1/1986 | Larson et al. |
| 4,605,592 A | 8/1986 | Paquette et al. |
| 4,614,667 A | 9/1986 | Larson et al. |
| 4,741,969 A | 5/1988 | Hayama et al. |
| 4,775,594 A | 10/1988 | Desjarlais |
| 5,045,386 A | 9/1991 | Stan et al. |
| 5,126,195 A | 6/1992 | Light |
| 5,141,790 A | 8/1992 | Calhoun et al. |
| 5,198,306 A | 3/1993 | Kruse |
| 5,202,190 A | 4/1993 | Kantner et al. |
| 5,229,207 A | 7/1993 | Paquette et al. |
| 5,290,615 A | 3/1994 | Tushaus et al. |
| 5,372,884 A | 12/1994 | Abe et al. |
| 5,501,902 A | 3/1996 | Kronzer |
| 5,648,164 A | 7/1997 | Sakaki et al. |
| 5,766,398 A | 6/1998 | Cahill et al. |
| 5,853,899 A | 12/1998 | Anderson et al. |
| 5,932,355 A | 8/1999 | Iqbal et al. |
| 6,096,469 A | 8/2000 | Anderson et al. |
| 6,140,390 A | 10/2000 | Bugner et al. |
| 6,265,053 B1 * | 7/2001 | Kronzer et al. .......... 428/32.12 |
| 6,284,819 B1 * | 9/2001 | Darsillo et al. ................ 524/22 |
| 6,387,473 B1 | 5/2002 | Sismondi et al. |
| 6,485,812 B1 * | 11/2002 | Sekiguchi ................ 428/32.29 |
| 6,497,781 B1 * | 12/2002 | Dalvey et al. ............... 156/234 |
| 2002/0015908 A1 * | 2/2002 | Hare et al. ................... 430/263 |
| 2002/0061459 A1 * | 5/2002 | Hare et al. ................... 430/256 |
| 2003/0170429 A1 * | 9/2003 | Engle et al. ............. 428/195.1 |

FOREIGN PATENT DOCUMENTS

| | | |
|---|---|---|
| DE | 199 52 356 A1 | 5/2000 |
| EP | 0 570 515 B1 | 6/1996 |
| EP | 0 805 049 A1 | 11/1997 |
| JP | 08-207426 | 8/1996 |
| JP | 08-207450 | 8/1996 |
| WO | 10-016382 | 1/1998 |
| WO | WO 99/03685 | 1/1999 |
| WO | WO 99/12743 | 3/1999 |
| WO | WO 99/55537 | 11/1999 |
| WO | WO 99/65701 | 12/1999 |
| WO | WO 99/65702 | 12/1999 |
| WO | WO 99/65703 | 12/1999 |
| WO | WO 00/01539 | 1/2000 |

OTHER PUBLICATIONS

U.S. Appl. No. 09/583,294, Optically Transmissive Microembossed Receptor Media, filed May 31, 2000.
U.S. Appl. No. 09/583,295, Random Microembossed Receptor Media, filed May 31, 2000.

* cited by examiner

*Primary Examiner*—B. Shewareged

(57) ABSTRACT

In one aspect, the invention provides ink receptor compositions capable of receiving and fixing a water resistant image on a substrate without bleeding, feathering, or smudging. The ink receptor compositions comprise colloidal alumina; multivalent metal ion; hydrophilic binder; hydrophobic latex; surfactant; and optionally an image transfer aid. In other aspects, the invention provides methods of imaging substrates, ink receptor media, and ink receptor kits.

20 Claims, 2 Drawing Sheets

INK RECEPTIVE COMPOSITIONS AND ARTICLES FOR IMAGE TRANSFER

CROSS-REFERENCE TO RELATED APPLICATION

This Application is a divisional of U.S. application Ser. No. 09/834,471, filed on Apr. 13, 2001, now abandoned; which is a continuation-in-part of U.S. application Ser. No. 09/634,413, filed on Aug. 8, 2000, now abandoned, the disclosures of which are herein incorporated by reference.

BACKGROUND

The invention relates to ink receptor compositions, ink receptors, ink receptor media, and methods of imaging ink receptor media at ambient temperature.

Direct inkjet printing onto a variety of substrates such as films, papers, and fabrics has been used to generate graphic images. However, for substrates that are either of poor dimensional stability (such as many fabrics), or that are too large to be handled using a conventional inkjet printer (for example, a wall of a room), indirect printing methods such as transfer printing methods are normally employed. Current inkjet transfer printing methods include printing onto fabrics that have adhesive backings adhering them to a release liner, or iron-on transfers.

Inkjet printing has been used to provide images on a wide variety of substrates including films, papers, fabrics, and the like. Commercially available inks for inkjet printers are typically aqueous based and employ dyes as colorants. Current commercially available inks generally lack the simultaneous properties of good image quality (e.g., high resolution and color density) and waterfastness or washfastness when printed on any of the above-mentioned substrates. This is important if the image is transferred to a surface that will encounter water or be washed in normal usage (for example, clothing, room walls, etc.).

Whether inkjet printing is performed in an industrial process or on a printer attached to a personal computer, there exists a need to be able to print an image on a wide variety of substrates that have the simultaneous properties of good image quality and waterfastness or even washfastness.

SUMMARY

In one aspect, the invention provides an ink receptor composition comprising a mixture of: colloidal alumina; multivalent metal ion; hydrophilic binder; hydrophobic latex; surfactant; and optionally an image transfer aid. Aluminum ion and anionic surfactant are preferred.

In another aspect, the invention provides an ink receptive coating comprising the dried product of an ink receptor composition of the invention.

In another aspect, the invention provides an ink receptor medium comprising a substrate with an ink receptor of the invention on at least one surface of the substrate. The ink receptor medium may optionally be imaged.

In another aspect, the invention provides an ink receptor medium kit comprising: an image transfer medium or an image storage medium; and an ink receptor composition of the invention. The image transfer medium may have a surface that is smooth or microembossed. The kit may also include a substrate to be imaged and/or an application tool to apply the ink receptor composition to the substrate. Preferably, the ink receptor composition is in a storage container in the kit.

In another aspect, the invention provides a method of printing and fixing an image onto a substrate comprising the steps of: applying an ink receptor composition of the invention onto a surface of a substrate; and printing or transferring an image onto the applied ink receptor composition. The ink receptor composition may also be dried prior to printing or transferring the image.

In another aspect, the invention provides a method of preparing a surface of any substrate to receive an image without application of external heat comprising the step of applying an ink receptor composition of the invention to the substrate. The ink receptor compositions and ink receptors of the invention are capable of receiving and fixing color images from an image transfer medium such that the image does not bleed, feather or smudge, using hand or finger pressure in the absence of any externally applied heat.

Some other advantages of ink receiving media of the invention include that they: are cost competitive, work with pigmented inks, have high resolution, have high color density, provide wide color gamut, are waterfast, and provide rapid drying. The compositions of the invention are also shear thinning, that is, the viscosity decreases with increased shear.

"Ink receptor composition" means the components of the composition are dissolved, dispersed or mixed in primarily water. "Ink receptor" means a dried ink receptor composition suitable for receiving ink. "Colloidal alumina" means stable, aqueous colloidal dispersion of alumina in water. "Hydrophilic binder" means a polymer that is at least partially soluble or swellable in deionized water. "Hydrophobic latex" means a latex polymer dispersion that dries or cures and having a surface characterized by an advancing contact angle with deionized water of greater than about 60 degrees.

An "image transfer medium" is any medium which is capable of receiving an image and then transferring an image to another substrate. A "micro-embossed element" means a recognizable geometric shape that either protrudes or is depressed. "Micro-embossed capacity" means that the imaging surface is capable of receiving at least one drop of inkjet ink within or about each micro-embossed element on the imaging surface. A "micro-embossed" or "microstructured" surface has a topography wherein the average micro-embossed element pitch, that is, center to center distance between features, is from about 1 to about 1000 micrometers and average peak to valley distances of individual features is from about 1 to about 100 micrometers. "Micro-embossing" means embossing a surface and making it a micro-embossed surface. "Nonporous" means that the integral imaging surface of the sheet is not substantially porous to liquid inks. "Ink release coating" means a coating that provides for the release of not only inks but other printed materials as well. "Surface energy" as used herein is equal to the surface tension of the highest surface tension liquid (real or imaginary) that will completely wet a solid with a contact angle of 0 degrees, which may be determined by measuring the critical surface tension from static contact angles of pure liquids using the method of W. A. Zisman described in "Relation of Equilibrium Contact Angle to Liquid and Solid Constitution", *ACS Advances in Chemistry Series* #43, American Chemical Society, 1961, pages 1–51, incorporated by reference herein.

DETAILED DESCRIPTION

The ink receptor compositions and ink receptors of the invention contain colloidal alumina. Colloidal alumina functions as an ink fixing agent for dye based inks. Useful colloidal alumina compositions include alumina colloids, aluminosilicate colloids; and surface treated alumina colloids that have been surface treated with, for example, alumina, or an organosilane (such as aminopropyltriethoxysilane, etc.). Colloidal alumina is present in the compositions of the invention in an amount of from about 20 to about 50 weight percent, preferably from about 25 weight percent to about 40 weight percent, and more preferably from about 28 weight percent to about 33 weight percent on a solids basis.

Preferably, the average particle diameter of the colloidal alumina particles is from about 100 to about 900 nm. More preferably, the average particle diameter of the colloidal alumina particles is about 150 to 600 nm, and even more preferably from about 200 to about 400 nm.

Nonlimiting examples of colloidal alumina dispersions according to the invention include water dispersible alumina, organic solvent dispersible alumina, or acid dispersible alumina, for example, those colloidal aluminas available under the trade designations "DISPERAL" and "DISPAL" from Condea Vista Co., Houston Tex. Specific examples include DISPERAL S (15 micrometers average particle diameter acid dispersible colloidal boehmite); DIPERAL 40 (50 micrometers average particle diameter acid dispersible colloidal boehmite); DISPERAL HP14 (35 micrometers average particle diameter acid dispersible colloidal boehmite); DISPERAL 11N7-80 (40 micrometers average particle diameter water dispersible colloidal alumina); DISPAL 11N7-12 (180 nm average particle diameter water dispersible colloidal alumina); DISPERAL AL 25 (200 nm average particle diameter water dispersible colloidal alumina); and DISPAL 23N-20 (100 nm average particle diameter water dispersible colloidal alumina, and the like.

The ink receptor compositions and ink receptors of the invention contain one or more water soluble multivalent metal ions. Suitable multivalent metal ions may be from group IIA to VIA and more preferably, from IB to VIIIB in the Periodic Table. Specific examples include but are not limited to, Al, Mg, Zn, Fe, Bi, Ga, Sr, Ca, Ti, and Zr. The metal ions are derived from salts of various inorganic acids such as sulfuric, nitric, hydrochloric, and the like, and organic acids such as sulfonic (including fluorinated sulfonic acids), carboxylic acids (including fluorinated carboxylic acids), phenols, hydroxy acids, and mixed functionalities thereof.

Aluminum ions are the preferred multivalent metal ions in the compositions of the invention. The aluminum ion from the aluminum salt fixes the pigment of pigment-based inks. Preferred examples of useful aluminum salts include, but are not limited to, aluminum sulfate, aluminum nitrate, aluminum sulfophthalate, aluminum sulfoisophthalate, and combinations thereof. Multivalent metal ion in the form of a metal salt is present in the compositions of the invention at a level of from about 8 weight percent to about 45 weight percent, preferably from about 10 to about 25 weight percent, and more preferably from about 14 to about 18 weight percent on a solids basis.

The ink receptor compositions and ink receptors of the invention contain one or more hydrophilic binders. The hydrophilic binder enhances color density of the image by allowing the ink to "wet out" over the surface of the ink receptor medium. Further, the hydrophilic binder provides the simultaneous functions of a binder and a dye fixing agent. Preferably, the hydrophilic binders are organic and are soluble or dispersible (at high solids levels in the ink receptor composition) in water so that they may be easily incorporated into compositions used to coat substrates in forming ink receptor media of the invention. Useful compounds that may be used as hydrophilic binders or as a significant portion of the hydrophilic binders include copolymers of vinyl pyrrolidone and acrylates, copolymers of vinyl pyrrolidone and methacrylamides, and substituted derivatives thereof; vinyl acetate copolymers, for example, copolymers of vinyl pyrrolidone and vinyl acetate, copolymers of vinyl acetate and acrylic acid, and the like, and hydrolyzed derivatives thereof; polyvinyl alcohol, acrylic acid homopolymers and copolymers; acrylamide homopolymers and copolymers; cellulosic polymers; styrene copolymers with allyl alcohol, acrylic acid, and/or maleic acid or esters thereof; alkylene oxide polymers and copolymers; gelatins and modified gelatins; polysaccharides, and the like, as disclosed in U.S. Pat. Nos. 5,766398; 4,775,594; 5,126,195; and 5,198,306.

Preferred hydrophilic binders include copolymers of vinyl pyrrolidone and dialkylaminoalkylmethacrylamides such as vinylpyrrolidone/N,N-dimethylaminopropylmethacrylamide copolymer, available from International Specialty Products of Wayne, N.J., under the trade designation "VIVIPRINT."

The hydrophilic binder is typically present in the ink receptor compositions of the invention at a level of from about 10 to about 35 weight percent, preferably from about 13 to about 30 weight percent, more preferably, from about 18 to about 24 weight percent on a solids basis.

The ink receptor compositions and ink receptors of the invention contain hydrophobic latex. The hydrophobic latex provides water resistance to an applied image. Useful hydrophobic latexes have a degree of flexibility, especially when used in ink receptor compositions that are used on fabrics so that the applied and dried ink receptor composition does not flake off during handling. For this reason, useful hydrophobic latexes, when dry, have a glass transition temperature (Tg) in the range of from about −60° C. to about 100° C., preferably from about −40° C. to 70° C., more preferably from about −30° C. to about 30° C.

Examples of suitable hydrophobic latexes for use in the ink receptor compositions of the invention include, but are not limited to, those based on acrylates such as copolymers of butyl acrylate, ethyl acrylate, acrylic acid, methacrylic acid, methyl methacrylate, acrylonitrile, styrene, N-metholacrylamide, and the like; polyurethanes; polyesters; and polyamides. Commercially available latexes useful in the invention include acrylate latexes available under the trade designations "Rohamere 132", "Rohamere 1878", "Rohamere 1900-D", "Rohamere 1970-D", "Rohamere 3045", "Rohamere 31-130", "Rohamere 4096D", "Rohamere 587", "Rohamere 84116", "Rohamere 8437", "Rohamere 8464", "Rohamere 8478", "Rohamere 8662" and "Rohamere 87219", all available from Rohm Tech Inc. of Malden, Mass. A variety of hydrophobic latexes having suitable physical characteristics for the practice of this invention are commercially available under the trade designation "RHOPLEX" from Rohm and Haas Co. of Philadelphia, Pa. Vinyl acetate/ethylene latexes having suitable physical characteristics are available under the trade designation "AIRFLEX" and polyvinyl acetate homopolymers are available under the trade designation "VINAC", both from Air Products and Chemicals, Inc. of Allentown, Pa.

Hydrophobic latex emulsions are present in the compositions of the invention at a level of from about 15 weight percent to about 35 weight percent, preferably from about 18 weight percent to about 31 weight percent, and even more preferably from about 22 weight percent to about 28 weight percent on a solids basis.

The ink receptor compositions and ink receptors of the invention contain surfactant. The surfactant is present to help control bleeding of the ink when an image is printed or transferred onto an ink receptor medium. Useful surfactants can be cationic, anionic, nonionic, or zwitterionic. Many of each type of surfactant are widely available to one skilled in the art. Accordingly, any surfactant or combination of surfactants that will render a substrate hydrophilic, could be employed.

These may include but are not limited to fluorochemical, silicone and hydrocarbon-based surfactants wherein the said surfactants may be anionic or non-ionic. Furthermore, the non-ionic surfactant may be used either as it is or in combination with another anionic surfactant in water and/or organic solvent or solvents, said organic solvent being selected from the group consisting of alcohols, ethers, amides, ketones, and the like.

Various types of non-ionic surfactants can be used, including but not limited to: ZONYL fluorocarbons (e.g., ZONYL FSO, available from E.I. du Pont de Nemours and Co. of Wilmington, Del.); PLURONIC block copolymers of ethylene and propylene oxide to an ethylene glycol base (available from BASF Corp. Chemicals Division of Mount Olive, N.J.); TWEEN polyoxyethylene sorbitan fatty acid esters (available from ICI Americas, Inc. of Wilmington, Del.); TRITON X series octylphenoxy polyethoxy ethanol (available from Rohm and Haas Co. of Philadelphia, Pa.); SURFYNOL tetramethyl decynediol (available from Air Products and Chemicals, Inc. of Allentown, Pa.); and SILWET L-7614 and L-7607 silicon surfactants (available from Union Carbide Corp. of Danbury, Conn.), and the like known to those skilled in the art.

Useful anionic surfactants include, but are not limited to, alkali metal and (alkyl)ammonium salts of: 1) alkyl sulfates and sulfonates such as sodium dodecyl sulfate and potassium dodecanesulfonate; 2) sulfates of polyethoxylated derivatives of straight or branched chain aliphatic alcohols and carboxylic acids; 3) alkylbenzene or alkylnaphthalene sulfonates and sulfates such as sodium laurylbenzenesulfonate; 4) ethoxylated and polyethoxylated alkyl and aralkyl alcohol carboxylates; 5) glycinates such as alkyl sarcosinates and alkyl glycinates; 6) sulfosuccinates including dialkyl sulfosuccinates; 7) isethionate derivatives; 8) N-acyltaurine derivatives such as sodium N-methyl-N-oleyltaurate); 9) amphoteric alkyl carboxylates such as amphoteric propionates and alkyl and aryl betaines, optionally substituted with oxygen, nitrogen and/or sulfur atoms; and 10) alkyl phosphate mono or di-esters such as ethoxylated dodecyl alcohol phosphate ester, sodium salt.

Useful cationic surfactants include alkylammonium salts having the formula $C_nH_{2n+1}N(CH_3)_3X$, where X is OH, Cl, Br, $HSO_4$ or a combination of OH and Cl, and where n is an integer from 8 to 22, and the formula $C_nH_{2n+1}N(C_2H_5)_3X$, where n is an integer from 12 to 18; gemini surfactants, for example those having the formula: $[C_{16}H_{33}N(CH_3)_2 C_mH_{2m+1}]X$, wherein m is an integer from 2 to 12 and X is as defined above; aralkylammonium salts such as, for example, benzalkonium salts; and cetylethylpiperidinium salts, for example, $C_{16}H_{33}N(C_2H_5)(C_5H_{10})X$, wherein X is as defined above.

Surfactant is present in the compositions of the invention at a level of from about 15 weight percent to about 35 weight percent, preferably from about 18 weight percent to about 31 weight percent, and more preferably from about 22 weight percent to about 28 weight percent on a solids basis.

The ink receptor compositions and ink receptors of the invention may optionally contain an image transfer aid. Image transfer aids are water-soluble polymeric thickeners, having medium to high molecular weight such that they have viscocities in the range of from 3,000 to 6,000 cps (30 to 60 Pa s) at ambient temperature. Their function is to enhance image transfer in the special case of image transfer from an image transfer medium. Image transfer aids are unnecessary when direct printing onto ink receptor compositions of the invention. Non-limiting examples of useful transfer aids include cellulosic polymers such as carboxymethyl cellulose, carboxyethyl cellulose, carboxypropyl cellulose, hydroxypropylmethylcellulose and cellulose acetate.

Image transfer aids may optionally be present in the compositions of the invention at a level of from about 0.2 weight percent to about 1 weight percent, preferably from about 0.3 weight percent to about 0.8 weight percent, and more preferably from about 0.5 weight percent to about 0.7 weight percent on a solids basis.

The ink receptor compositions of the invention also contain water. The ink receptor compositions may also additionally contain organic solvent. Organic solvent may be selected from the group consisting of alcohols, hydroxy-ethers, hydroxy-amides, ketones, and the like, with isopropyl alcohol being preferred. Solvent may be present at a level of from about 1 to about 20 weight percent, preferably, from about 2 to about 12, and more preferably, for about 3 to about 7 weight percent.

Method of Making Ink Receptor Compositions

The ink receptor compositions of the invention can generally be made by simply mixing the dry components in the desired amounts in water and solvent if present. For larger quantities of ink receptor composition, mixing is preferably done using a high speed electrical mixer such as an Ultra-Turax T-65, with cold water cooling, available from Divtech Equipment, Cincinnati, Ohio, although any mechanical mixing means may be used.

Method of Using the Compositions of the Invention

In another embodiment, the invention provides a method of printing and fixing an image onto a substrate comprising the steps of applying an ink receptor composition of the invention to a surface of a substrate, and printing or transferring an image onto the ink receptor on the surface of the substrate. The image is advantageously transferred at ambient temperature using light pressure, for example using hand or finger pressure. Preferably, the applied ink receptor composition of the invention is damp prior to printing or transferring the image. After the image is transferred, the ink receptor composition is dried or allowed to dry at ambient temperature. However, an ink receptor composition of the invention may be also be applied to a substrate, dried, and then imaged if desired. Typical wet coating weights for the ink receptor compositions of the invention are from about 1 $g/ft^2$ to about 5 $g/ft^2$ (0.0011 $g/cm^2$ to about 0.0055 $g/cm^2$, preferably from about 1.8 to about 2.5 $g/ft^2$ (0.00198 to 0.00275 $g/cm^2$).

Substrates

The compositions of the invention may be applied to a wide variety of substrates by any means that is capable of providing a coating of ink receptor composition on the surface to be imaged. Any substrate that may be printed directly or transfer printed upon can be coated with the compositions of the invention. These substrates may be planar or have curves and corners. Such substrates include ceramics such as ceramic tiles, ceramic housewares including dishes (especially mugs and plates), vases, dolls and lamps, bricks (including architectural brick), and the like; painted or unpainted wall surfaces such as wallboard, plaster, wood, tiles, doors (including shower and garage doors), and the like; household items such as dishes, furniture, electronic devices such as for example computers, photoframes and scrapbooks, drapes, blinds, pet cages, and the like; office supplies such as transparency films, "POST-IT" brand repositionable notes, easel pads, school supplies, file folders, envelopes, stationery, and the like; clothing and accessories such as T-shirts, tote bags, scarves, work uniforms, sports uniforms, paper gowns, and the like; the human body; glass substrates such as architectural windows, vehicle windows, drinking glasses, eye glasses, aquariums, lamp shades, glass plates and substrates capable of being directly printed using a printer for example an ink jet printer. The printer may be desk-top size or wide format or any size in between.

Image Transfer Media

Images may be printed upon the ink receptor media of the invention by conventional printing methods such as ink jet, screen printing, etc. Another method of printing an image onto an ink receptor or ink receptor medium of the invention is by transfer printing. "Transfer printing" is a method for indirect printing of an image by printing an ink image onto an image transfer medium and transferring the image to a second substrate without the application of external heat. The image can be transferred using minimal or low pressure (for example, on the back surface of the transfer medium), and which may be applied with a finger or hand. Transfer printing allows images to be placed upon objects or substrates that could not otherwise be printed using a standard, commercially available ink jet printer.

Any transfer medium that is capable of transferring an ink image to another substrate may be used. Such transfer media include those having a smooth transfer surface, for example, as described in U.S. Pat. No. 6,153,038 (Brooker) and those having a microembossed surface as described below.

Figure 1:
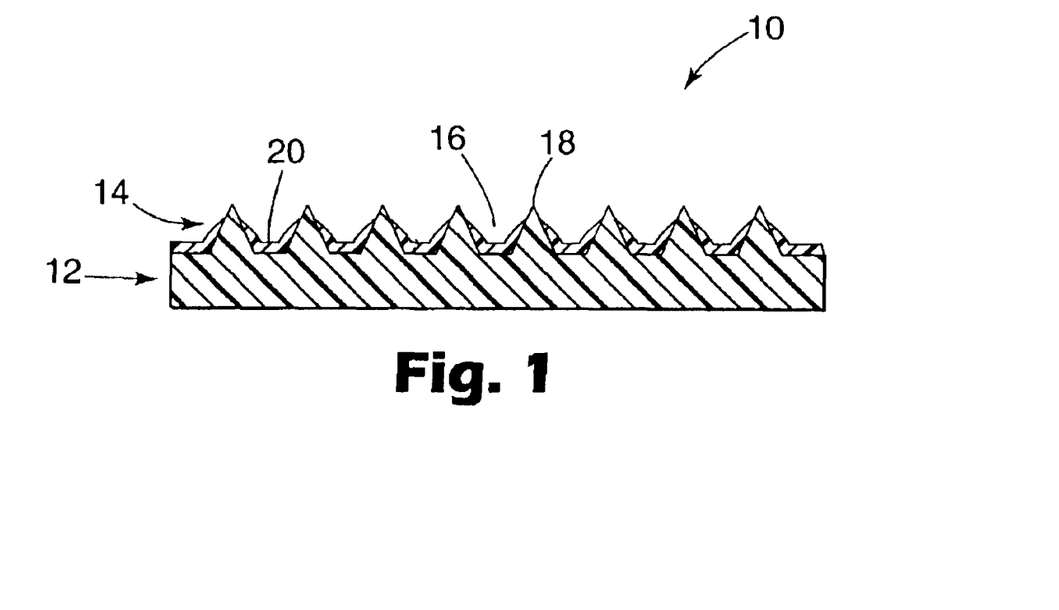
FIG. 1 shows a magnified illustrative cross sectional view of an embodiment of an image transfer medium useful with the invention.

FIG. 1 illustrates a preferred embodiment of a microembossed image transfer medium: an image transfer medium 10 that is constructed of a sheet 12 having an imaging surface characterized by a micro-embossed image surface topography 14 of multiple wells or cavities 16 and peaks 18 and having a coating of an ink release material 20. The imaging surface of the sheet is nonporous as defined above. The ink release material is used to lower the surface energy of the micro-embossed image surface, which facilitates ink transfer. The image transfer medium 10 is useful for receiving an ink image and protecting the ink image from abrasion, and then capable of transferring the ink to another substrate. FIG. 1 also illustrates an ink drop 30 within one cavity 16 such that the outermost surfaces or peaks 18 of the micro-embossed topography, on a macroscopic level, control placement of the ink drop 30 before transfer.

Sheet 12 used in the image transfer medium can be made from any polymer or combination of polymers capable of being micro-embossed in the manner of the present invention.

The ink release coating is a coating that resides on the micro-embossed surface. The ink release coating may be continuous or discontinuous and is preferably continuous. The purpose or function of the ink release coating is to lower the surface energy of the micro-embossed surface of the image transfer medium, thereby facilitating a more complete transfer of the ink to a second substrate to form an image of high color density to a second substrate. Without the ink release coating, only portions of the image may transfer or only a top portion of the ink contained in each cavity may transfer to the second substrate, requiring perhaps a second ink image printed and transferred. Thus, useful ink release coatings are those coatings that can be applied or migrate to the micro-embossed surface of the sheet to lower the surface energy of the portions of the cavities which ink will contact such that at least 20 percent, preferably at least 50 percent, even more preferably at least 75 percent of the ink is transferred as measured by reflectance color density.

Preferred ink release coatings include compositions comprising silicones, fluorochemicals, and polymers thereof. Alternatively, additives may be incorporated into polymeric materials used for sheets or surfaces of sheets that migrate to the surface of the image transfer medium and provide a low surface energy coating, that is, ink release coating. These additives may be added to thermoplastic and/or thermoset resins that are extruded and micro-embossed to form image transfer media of the invention. Useful surface energy modifying additives include silicone surfactants such as those available from Osi Specialties, Inc., of Danbury, Conn., under the tradename SILWET.

Preferred ink release coatings provide the micro-embossed surface with a surface energy of about 43 dyne/centimeter or less, preferably about 30 dyne/centimeter or less, more preferably about 25 dyne/centimeter or less. Ink release coating materials that will provide surface energies of 43, 30, and 25 dynes/centimeter or less are commercially available.

In general, the choice of geometrical configuration of the specific micro-embossed features does not greatly influence image transfer performance, so long as there is sufficient micro-embossed capacity to control placement of an individual drop of ink. In some preferred embodiments, the geometrical configuration is chosen such that the micro-embossed element pitch (i.e., center to center distance between micro-embossed elements) is less than about 340 micrometers. In further preferred embodiments, the micro-embossed micro-embossed element density of the pattern is such that the cavity walls actually collapse when moderate pressure is applied by hand to effect the transfer of the image.

For example, low density polyethylene walls micro-embossed as an orthogonal grid and having an average wall thickness of 10–25 micrometers, spaced with a micro-embossed element pitch of 338 micrometers, and having square cavities with a depth of 25 micrometers, completely collapse during image transfer with moderate hand pressure. On the other hand, the same low density polyethylene material micro-embossed with an orthogonal grid pattern with walls 10–25 micrometers thick, spaced with a micro-embossed element pitch of 127 micrometers, and having square cavities with a depth of 25 micrometers do not collapse.

In general, the amount of ink transferred from films with collapsible features is superior to those films containing more rigid features. Silicone rubber micro-embossed elements are preferred, since they collapse under pressure, but quickly recover to their original shape when pressure is removed so the film can be used again.

In a preferred embodiment, the micro-embossed imaging surface topology is chosen so that ink droplets printed onto the micro-embossed surface do not protrude above the tops of the micro-embossed elements thereby improving handling properties of imaged sheet.

Figure 2:
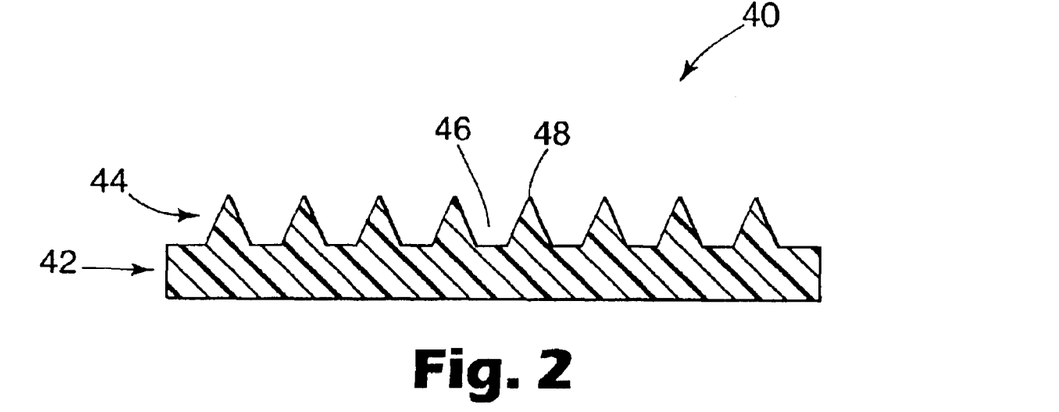
FIG. 2 shows a magnified illustrative cross sectional view of an embodiment of an image transfer medium useful with the invention.

In another embodiment, shown in FIG. 2, the image transfer medium 40 is constructed of a sheet 42 having an micro-embossed imaging surface topography 44 of multiple wells or cavities 46 and peaks 48 wherein the micro-embossed or image surface has ink release properties. In this embodiment, the micro-embossed imaging surface itself has ink release properties, that is, the micro-embossed surface has a surface energy that facilitates the transfer of ink from the surface topography without any additional ink release coating added (See FIG. 1). The imaging surface of the sheet is also nonporous as defined above.

Materials having a surface energy in the range of from about 43 dyne/centimeter or less are suitable for use as sheets 42 or as a micro-embossed surface topography 44. Non-limiting examples of materials that provide a suitable surface energy include polymeric materials such as polydimethylsiloxanes, fluorinated polymers, polyolefins (e.g., such as polyethylene, polypropylene, etc.) and polyvinyl chloride. For use with aqueous inks, useful materials have a surface energy of less than about 43 dyne/centimeter, with materials having a surface energy of from about 30 dyne/centimeter or less being preferred. For use with non-aqueous inks (i.e., solvent based or 100 percent solids), materials having a surface energy of from about 30 dyne/centimeter or less are useful, preferably from about 25 dyne/centimeter or less.

Figure 3:
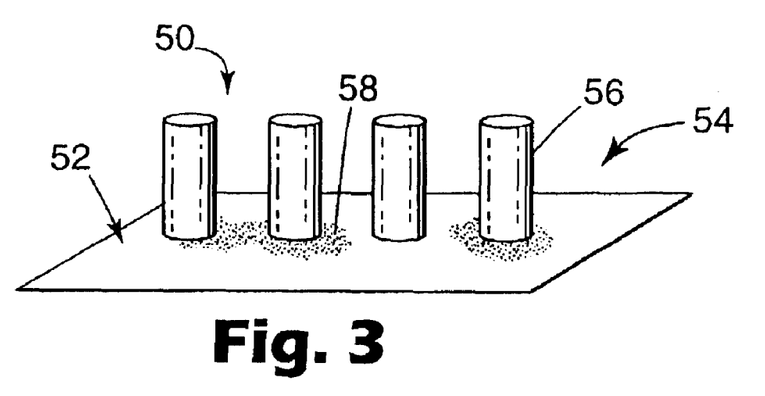
FIGS. 3 and 4 show magnified illustrative cross sectional views of further embodiments of the invention.

In another embodiment, shown in FIG. 3, the image transfer medium 50 is constructed of a sheet 52 having a micro-embossed imaging surface topography 54 of multiple posts 56. The posts may be any protruding geometric shape, for example, circular, oval, trapezoidal, spiral, square, triangular, octagonal, and the like. Preferably, the space between posts is from about 10 to about 1000 micrometers, even more preferably from about 50 to about 800 micrometers, and even more preferably from about 200 to about 600 micrometers. Preferably, the height of the posts ranges from about 5 to about 100 micrometers, more preferably from about 10 to about 70 micrometers, even more preferably from about 10 to about 40 micrometers. Preferably, the diameter of the posts ranges from about 10 to about 150 micrometers, more preferably from about 10 to about 100 micrometers, and even more preferably from about 30 to about 90 micrometers. Preferably, the density of the posts ranges from about 1 to about 40 posts per square millimeter, more preferably from about 2 to about 20 posts per square millimeter, and even more preferably from about 2 to about 10 posts per square millimeter. As shown above, sheet 52 may be made from a material that provides an ink release property to the imaging surface. Alternatively, an ink release coating may be coated onto the imaging surface.

Figure 4:
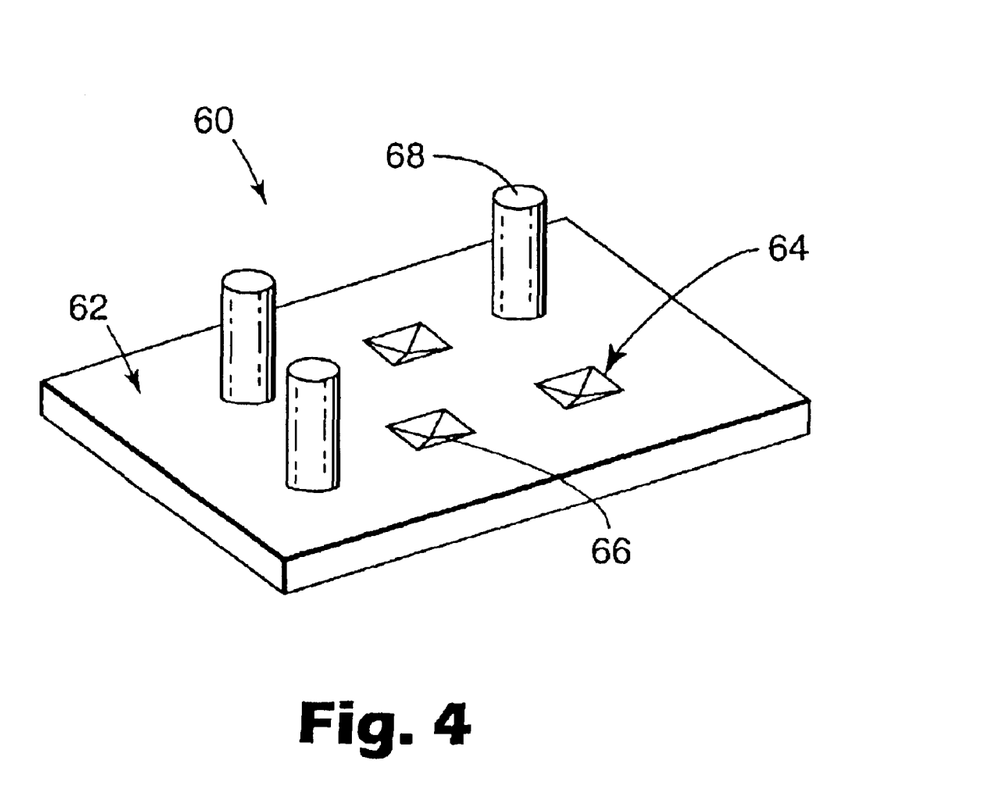

In another embodiment shown in FIG. 4, the image transfer medium 60 is constructed of a sheet 62 having a micro-embossed imaging surface topography 64 of wells or cavities 66 and posts 68. The cavities are spaced such that they provide control over the placement of the ink droplets while the posts are spaced to prevent accidental smearing of the wet ink. Preferably, the pitch of the cavities is finer than the pitch of the posts. However, the pitch of the cavities when combined with the posts can typically be wider than the pitch of cavities alone since the posts prevent the wet image from smearing during handling. The posts may also be applied in a random manner to an imaging substrate having cavities such that some of the posts are within a cavity. The height of the posts may or may not exceed the height of the walls of the cavities. As described above, the imaging surface may be constructed of a material that provides an ink release property or the imaging surface may be coated with an ink release coating.

The sheets in FIGS. 1–4 can be a solid film. The sheets may be transparent or translucent, clear or tinted, or optically transmissive. The sheets 12 and 42 are preferably transparent.

Nonlimiting examples of polymeric films useful as sheets in the present invention include thermoplastics such as polyolefins (for example, polyethylene, polypropylene, polybutylene, copolymers of styrene and butadiene, copolymers of ethylene and propylene, etc.); poly(vinyl chloride); hydrolyzed or unhydrolyzed copolymers of ethylene with vinyl acetate; polycarbonates; norbornene copolymers; fluorinated thermoplastics such as copolymers and terpolymers comprising hexafluoropropylene, vinylidene fluoride, tetrafluoroethylene, or vinyl fluoride, and surface modified versions thereof, poly(ethylene terephthalate) and copolymers thereof, polyurethanes, polyimides, acrylics, and filled versions of the above using fillers such as silicates, aluminates, feldspar, talc, calcium carbonate, titanium dioxide, and the like. Also useful in the application are non-wovens, coextruded films, and laminated films made from the materials listed above. A person of ordinary skill in the art can easily measure the surface energy of any of the above films to determine whether the films provide a suitable surface energy for use in an image transfer media described by FIG. 2 and the accompanying text.

More specifically, polyolefins can be ethylene homopolymers or copolymers, such as "7C50" brand ethylene propylene copolymer commercially available from Union Carbide Co. of Houston, Tex. Other specifically useful films include "LEXAN" polycarbonate from General Electric Plastics of Pittsfield, Mass., "ZEONEX" polymer from B. F. Goodrich of Richfield, Ohio, fluoropolymers such as "THV-500" and "THV 250" polymers from Dyneon LLC of Oakdale, Minn., plasticized poly(vinyl chloride), poly(ethylene terephthalate) copolymer "EASTAR" 6763 from Eastman Chemical Co. of Kingsport, Tenn., "AFFINITY" PL 1845 from Dow Chemical Co. of Midland, Mich., and SURLYN™ acrylic acid copolymers from E. I. Du Pont de Nemours and Co. of Wilmington, Del.

In further embodiments of the sheets of FIGS. 1–4, any sheet suitable for feeding into an inkjet printer may be further coated, laminated, or co-extruded with one or more of the polymers suitable for use in polymeric films of according to the invention and further micro-embossed (and, if necessary, coated with an ink release material as described herein) to provide image transfer media of the invention. Non-limiting examples of such sheets are papers, including for example xerographic grade papers, specialty inkjet papers, and coated papers, etc.; nonwoven materials, including for example spunbond polyolefins, etc.; card stock; envelopes; etc.

Thermoset materials are also additionally useful as materials for sheet 42 or micro-embossed imaging surface topography 44. For example, reactive silicones (either two-part or moisture curable, UV-curable materials (e.g., acrylate mixtures) may be applied to a micro-embossed roll, cured and removed from the roll to give an micro-embossed film having an inverse image of the roll.

The structure of the micro-embossed surface topography can be any structure that provides cavities that will each hold at least 10 pL of ink. For example, the topographies for the cavities can range from the extreme of cubic cavities with parallel vertical, planar walls, to the extreme of hemispherical cavities, with any possible solid geometrical configuration of walls in between the two extremes. Specific examples include conical cavities with angular, planar walls, truncated pyramid cavities with angular, planar walls, and cube corner shaped cavities. Other useful micro-embossed structures are described in co-pending U.S. application Ser. No. 09/713,610, filed on Nov. 15, 2000; and 09/583,294 and 09/583,295, filed on May 31, 2000, incorporated by reference herein for the micro-embossed structures and methods of making micro-embossed substrates.

The pattern of the topography can be regular, random, or a combination of the two. "Regular" means that the embossing pattern is planned and reproducible regardless of the pattern of the embossing. "Random" means one or more features of the micro-embossed elements are intentionally and/or systematically varied in a non-regular manner. Examples of features that are varied include for example, micro-embossed element pitch, peak-to-valley distance, depth, height, wall angle, edge radius, and the like. Combination patterns may for example comprise patterns that are random over an area having a minimum radius of ten cavity widths from any point, but these random patterns can be reproduced over larger distances within the overall pattern.

More than one drop of ink may be contained in a cavity because the mixing of the colors cyan, yellow, and magenta are required to create the infinite number of colors demanded in the inkjet industry. Thus, the volume of the cavities should be capable of holding as many as three drops of different colors of ink. The volume of a cavity can range from about 1 to about 20,000 pL, preferably from about 1 to about 10,000 pL, more preferably from about 3 to about 1,000 pL, even more preferably from about 30 to about 10,000 pL, and even more preferably from about 300 to about 10,000 pL.

For applications in which desktop inkjet printers (typical drop size of 3–20 pL) will be used to generate the image, cavity volumes of from about 1000 to about 3000 pL are preferred. For applications in which large format desktop inkjet printers (typical drop size of 10–200 pL) will be used to generate the image, cavity volumes of from about 3,000 to about 10,000 pL are preferred.

Another way to characterize the structure of the cavities is to describe the cavities in terms of aspect ratios. An "aspect ratio" is the ratio of the depth to the width of the cavity. Useful aspect ratios range from about 0.01 to about 2, preferably from about 0.05 to about 1, and more preferably from about 0.05 to about 0.3.

The overall depth of the cavities depends on the shape, aspect ratio, and desired volume of the cavities. For a cubic-shaped cavity, the depth ranges from about 5 to about 100 micrometers. For a hemispherical-shaped cavity, the depth ranges from about 7 to about 100 micrometers. The depths of other geometrically shaped cavities reside in between these two extremes for a given volume.

Micro-embossed element pitch of the micro-embossed image transfer media of the invention are in the range of from 1 to about 1000 micrometers, preferably from 10 to about 500 micrometers, more preferably from about 50 to about 400 micrometers. It is recognized that in some embodiments of the invention, it may not be necessary, or desirable, that uniform micro-embossed element pitch be observed between micro-embossed elements, nor that all features be identical. Thus, an assortment of different types of features, for example, cavities or wells with, perhaps, an assortment of micro-embossed element pitches may comprise the micro-embossed surface of the image transfer media according to the invention.

Image transfer media of the invention may be prepared and used in many dimensions. Useful lengths may be from about 1 centimeter up to 2,000 meters or even longer (especially when used in roll form). Useful widths may be from about 0.5 centimeter up to about 250 centimeters or even wider. Useful thicknesses of image transfer media of the invention may range from about 25 micrometers up to 0.5 millimeter or even higher so long as the material may be printed by inkjet means.

The image transfer media of the invention may also optionally have an ink receptive coating on the micro-embossed imaging surface. The ink receptive coating may comprise one or more layers. The purpose of the ink receptive coating is to limit migration of colorant both prior to and after subsequent image transfer. The ink receptive coating may be used on any image transfer media described in this application.

Useful ink receptive coatings are hydrophilic and aqueous ink sorptive. Such coatings include, but are not limited to, polyvinyl pyrrolidone, homopolymers and copolymers and substituted derivatives thereof; vinyl acetate copolymers, for example, copolymers of vinyl pyrrolidone and vinyl acetate, copolymers of vinyl acetate and acrylic acid, and the like, and hydrolyzed derivatives thereof; polyvinyl alcohol, acrylic acid homopolymers and copolymers; acrylamide homopolymers and copolymers; cellulosic polymers; styrene copolymers with allyl alcohol, acrylic acid, and/or maleic acid or esters thereof; alkylene oxide polymers and copolymers; gelatins and modified gelatins; polysaccharides, and the like, as disclosed in U.S. Pat. Nos. 5,766398; 4,775,594; 5,126,195; and 5,198,306. Vinyl pyrrolidone homopolymers and copolymers are preferred.

Optionally, the ink receptive coatings may also include additives that provide a visual property to the transferred image. Such additives include glitter, glass bubbles, pigments, mica, UV absorbers and stabilizers, etc.

Additionally, the image transfer media of the invention may also have one or more surfactants coated onto the micro-embossed imaging surface. Examples of useful surfactants include those described in U.S. Pat. No. 5,932,355 at column 7, lines 22–31, incorporated by reference in this application.

The transfer medium 10 optionally has an adhesive layer on the major surface of the sheet opposite micro-embossed image surface 12 that is also optionally but preferably protected by a release liner. After imaging, the receptor medium 10 can be adhered to a rigid substrate before image transfer.

The choice of adhesive and release liner depends on usage desired for the image graphic.

Pressure-sensitive adhesives can be any conventional pressure-sensitive adhesive that adheres to both the polymer sheet and to the surface of the item upon which the transfer medium having the precise image is to be placed. Pressure-sensitive adhesives are generally described in Satas, Ed., *Handbook of Pressure Sensitive Adhesives* 2nd Ed. (Von Nostrand Reinhold 1989), the disclosure of which is incorporated by reference. Pressure-sensitive adhesives are commercially available from a number of sources. Particularly preferred are acrylate pressure-sensitive adhesives commercially available from Minnesota Mining and Manufacturing Company, and generally described in U.S. Pat. Nos. 5,141,790; 4,605,592; 5,045,386; and 5,229,207; and EPO Patent Publication EP 0 570 515 B1.

Release liners are also well known and commercially available from a number of sources. Nonlimiting examples of release liners include silicone coated kraft paper, silicone coated polyethylene coated paper, silicone coated or non-coated polymeric materials such as polyethylene or polypropylene, as well as the aforementioned base materials coated with polymeric release agents such as silicone urea, fluorinated polymers, urethanes, and long chain alkyl acrylates, such as defined in U.S. Pat. Nos. 3,957,724; 4,567,073; 4,313,988; 3,997,702; 4,614,667; 5,202,190; and 5,290,615; the disclosures of which are incorporated by reference herein and those liners commercially available as POLYSLIK brand liners from Rexam Release of Oakbrook, Ill., and EXHERE brand liners from P.H. Glatfelter Company of Spring Grove, Pa.

Method of Forming Micro-Embossed Image Surface

The micro-embossed imaging surface can be made from any contacting technique such as casting, coating, or compressing techniques. More particularly, micro-embossing can be achieved by at least any of (1) casting a molten thermoplastic using a tool having a pattern, (2) coating of a fluid onto a tool having a pattern, solidifying the fluid, and removing the resulting micro-embossed solid, or (3) passing a thermoplastic film through a nip roll to compress against a tool having that micro-embossed pattern. Desired embossing topography can be formed in tools via any of a number of techniques well-known to those skilled in the art, selected depending in part upon the tool material and features of the desired topography. Illustrative techniques include etching (e.g., via chemical etching, mechanical etching, or other ablative means such as laser ablation or reactive ion etching, etc.), photolithography, stereolithography, micromachining, knurling (e.g., cutting knurling or acid enhanced knurling), scoring or cutting, etc.

Alternative methods of forming the micro-embossed image surface include thermoplastic extrusion, curable fluid coating methods, and embossing thermoplastic layers which can also be cured.

Compressing Method

This method uses a hot press familiar to those skilled in the art of compression molding.

The pressure exerted in the press typically ranges from about 48 kPa to about 2400 kPa.

The temperature of the press at the mold surface typically ranges from about 100° C. to about 200° C. and preferably from about 110° C. to about 150° C.

The dwell time of pressure and temperature in the press typically ranges from about 1 to about 5 minutes. The pressure, temperature and dwell time used depend primarily on the particular material being micro-embossed, as is well known to those skilled in the art. The process conditions should be sufficient to cause the material to flow and faithfully take the shape of the surface of the tool being used. Any generally available commercial hot press may be used, such as Wabash Model 20-122TM2WCB press from Wabash MPI of Wabash, Ind.

Extrusion Method

A typical extrusion process for the present invention involves passing an extruded material or preformed substrate through a nip created by a chilled roll and a casting roll having a surface having a random pattern inverse of desired micro-embossed image surface, with the two rolls rotating in opposite directions.

Single screw or twin screw extruders can be used. Conditions are chosen to meet the general requirements which are understood to the skilled artisan. Representative but non-limiting conditions are outlined below.

The temperature profile in the extruder can range from 100° C. to 250° C. depending on the melt characteristics of the resin.

The temperature at the die ranges from 150° C. to 230° C. depending on the melt strength of the resin.

The pressure exerted in the nip can range from about 140 to about 1380 kPa and preferably from about 350 to about 550 kPa.

The temperature of the nip roll can range from about 5° C. to about 150° C. and preferably from about 10° C. to about 100° C., and the temperature of the cast roll can range from about 25° C. to about 100° C. and preferably about 40° C. to about 60° C.

The speed of movement through the nip typically ranges from about 0.25 to about 10 m/min and preferably as fast as conditions allow.

Nonlimiting examples of equipment useful for this extrusion method include single screw extruders such as a 1¼ inch KILLION extruder, available from Killion Extruders, Inc. of Cedar Grove, N.J., equipped with a gear pump such as a ZENITH gear pump, available from Parker Hannifin Corp., Zenith Pumps Division of Sanford, N.C., to control flow rate; co-rotating twin screw extruders such as a 25 millimeters BERSTORFF extruder, available from Berstorff Corporation of Florence, Ky.; and counter-rotating twin screw extruders such as a 30 millimeters LEISTRITZ extruder, available from American Leistritz Extruder Corporation of Somerville, N.J. Flow rate in the twin screw extruder can be controlled using weight loss feeders such as a K-TRON extruder, available from K-tron America of Pitman, N.J., to feed the raw material into the extruder. A film die with adjustable slot is used to form a uniform film out of the extruder.

Calendering may be accomplished in a continuous process using a nip, as is well known in the film handling arts. In the present invention, a web having a suitable embossable thermoplastic exposed layer, and having sufficient thickness to receive the desired pattern is passed through a nip formed by two cylindrical rolls, one of which has an inverse image to the desired embossing engraved into its surface. The embossable thermoplastic exposed layer must contact the engraved roll at the nip. Sufficient heating to temperatures of from 100° C. up to 540° C. of the web so that embossing may occur may be supplied to the web prior to reaching the nip by radiant heat sources (e.g., heat lamps, infrared heaters, etc.) and/or by use of heated rolls at the nip. A combination of heat and pressure at the nip (typically, 100 to 500 lb/inch (1.8 kg/centimeter to 9 kg/centimeter)) is generally used in the practice of the present invention.

The image transfer media of the invention are useful for receiving an ink image and then transferring that image to another substrate. The transfer of the image is a "cold transfer" in that no external heat is required to transfer the image and the image is transferred at ambient temperature. Generally, an image is printed onto the micro-embossed surface of the image transfer media. The image transfer media is then applied to a second substrate coated with an ink receptor of the invention, image side down, and pressure is applied to the back of the image transfer medium such that the ink image is transferred to the second substrate. Then the image transfer medium is removed from the second substrate.

The image to be transferred is first preferably selected on a computer. After the image is selected, the image is manipulated or modified as desired on the computer. Examples of image manipulation include reversing, rotating, reducing, distorting, adjusting color, removing or adding background, removing or adding foreground, removing or adding images, and adjusting the brightness of the image. Then the image is printed onto the image transfer medium of the invention.

The image is preferably applied to the image transfer medium using inkjet printing techniques. Nonlimiting commercially available examples include thermal inkjet printers such as DESKJET brand, PAINTJET brand, DESKWRITER brand, DESIGNJET brand, and other printers commercially available from Hewlett Packard Corporation of Palo Alto, Calif., and the NovaJet brand wide format printers commercially available from Encad, Inc., of San Diego, Calif. Also included are piezo type inkjet printers such as those from Seiko-Epson, Raster Graphics, and Xerox, spray jet printers and continuous inkjet printers. Any of these commercially available printing techniques introduce the ink in a jet spray of a specific image into the medium of the present invention. Any of the above printers can be attached to a computer so to print computer generated images.

The image transfer media of the invention can be used with a variety of inkjet inks obtainable from many commercial sources. It should be understood that each of these inks has a different formulation, even for different colors within the same ink family. Nonlimiting sources include Minnesota Mining and Manufacturing Company, Encad Corporation, Hewlett Packard Corporation, Nukote, and the like. These inks are preferably designed to work with the inkjet printers described above, although the specifications of the printers and the inks will have to be reviewed for appropriate drop volumes and dot per inch (dpi) in order to further refine the usefulness of the present invention.

Once the image has been printed onto the transfer medium, the image can be transferred to a second medium or substrate. The image may be transferred to any substrate capable of receiving the ink image and being coated with an ink receptor composition of the invention. Specific examples include those listed above. Once the image transfer medium is placed onto the substrate, pressure is applied to the back of the transfer medium. The pressure is preferably applied by hand, but may be applied using rollers, stamps, or any other means of applying substantially vertical pressure to the back of the transfer medium. After sufficient pressure has been applied to the back of the transfer medium, the transfer medium is removed from the second substrate and the image transfer has been completed.

The ink receptor or the ink receptor composition of the invention may be provided with an image transfer medium as a part of a kit. The ink receptor composition could be contained in a container such as a bottle and the ink receptor could be coated onto the substrate to form an ink receptor medium. Such kits could also include a substrate to receive the image and/or an image storage medium such as a floppy disk, CD Rom, DVD disk, magnetic tape, computer chip and the like such that the user could be provided an image in a readily usable and compact form or be able to choose from a myriad of images. The kits could also include tools for the application of the ink receptor composition to the substrate such as brushes (foam, feather, cloth, paint, etc.) rollers, spray nozzles, applicator bottles, and the like.

EXAMPLES

Ink transfer was calculated by measuring color density of the imaged ink transfer medium before and after transfer using a "GRETAG SPM 55 REFLECTANCE DENSITO-METER" available from Gretag-Macbeth of Gastonia, N.C. Percent ink transfer was calculated according to the following equation:

Percent ink transfer=(reflective optical density of material receiving image)/(reflective optical density of material receiving image)+(reflective optical density of remainderon transfer sheet)×100 percent.

The image transfer sheet used in the examples was a "130 lines per inch" pattern of square cavities of 197 micrometers micro-embossed element pitch, cavity depth of 15 micrometers, and included wall angle of 60°. The wall thickness is 20 micrometers at the bottom of the cavity. Additionally, at the center of the bottom of this cavity resides a second cavity that increases the total volume of the structure. This second cavity is pyramid shaped (four sides proceeding to a point at the deepest point of the two-cavity structure). It is 38 micrometers wide at the opening, and is 10 micrometers deep with a 125° included angle of descent. It was prepared by micro-embossing a continuous film of low LDPE/PET/HDPE film (silicone release layer coated on the HDPE layer, from Rexam Release of Bedford Park, Ill.) on the surface treated with silicone using a corresponding engraved roll having an inverse image as the roll contacting the micro-embossed side of the web.

Images on image transfer sheet were transferred to substrates listed in the examples that follow by contacting the imaged surface of the image transfer sheet and rubbing the contacted sheet using hand and finger-pressure.

Waterfastness of the transferred images was determined by placing and stirring the imaged substrate in deionized water (~300 ml) in a beaker (~1 L), drying the substrate, and then comparing the optical densities before and after immersing in water.

"Aluminum sulphophthalate" is available from Aldrich Chemical, Milwaukee, Wis. (Aluminum salt).

"DISPAL 11N7-12" is a trade designation for 15 weight percent solids in water colloidal alumina dispersion and is available from Vista Chemical of Houston, Tex. (Colloidal alumina).

"ELEVES T0703WDO" is a trade designation for spunbonded polyethylene/polyester non-woven fabric (70 g/m$^2$ basis weight, 0.25 millimeter thickness) available from Unitika Ltd. of Tokyo, Japan.

"AEROSOL MA 80-I" is a trade designation for dihexyl sulfosuccinate sodium salt solution (80 weight percent in water/isopropyl alcohol=15:5) available from Cytec of West Paterson, N.J. (Surfactant).

"AIRFLEX 465" is a trade designation for an ethylenevinyl acetate copolymer latex emulsion (66 weight percent in water). "AIRFLEX 460" is a trade designation for an ethylene-vinyl acetate copolymer latex emulsion (63 weight percent in water). Both are available from Air Products and Chemicals of Allentown, Pa. (Hydrophobic latex).

"VIVIPRINT 111" is a trade designation for vinylpyrrolidone/N,N-dimethylaminopropylmethacrylamide copolymer (10 weight percent in water, $M_w$=1.2–1.5×10$^6$ g/mole, $T_g$=167° C.) available from International Specialty Products (ISP) of Wayne, N.J. (Transfer aid).

Isopropanol, vinylpyrrolidone/acrylic acid copolymer (75/25 mole ratio, M.W.=20,000 g/mole, Cat. No. 41,852-8), carboxymethylcellulose sodium salt (Cat. No. 32,306-3, viscosity 3,000–6,000 cps for 1 percent aqueous solution) are available from Aldrich Chemical Co. of Milwaukee, Wis. (Hydrophilic binder).

"METHOCEL F50" is a trade designation for hydroxypropylcellulose available from Dow Chemical Company of Midland, Mich.

"HP DeskJet855C", "HP DesignJet 2000CP", "HP DesignJet 3000CP" and "HP DeskJet 870C" are trade designations for inkjet printers available from Hewlett-Packard Corp. of Palo Alto, Calif. The inks used were: HP 855C and HP 870C-Part Nos. 51645 (black) and 51641A (color); HP 2000C-C4841A (cyan), C4842A (yellow), C4843A (magenta), C4844A (black); HP 3500 CP-C1892A (black, pigment based), C1893A (cyan, pigment based), C1895A (pigment, dye based), C1894A (magenta, pigment based).

No. 26 Meyer bars are wire-wound coating rods (nominal wet film thickness is 0.054 mm) available from R D Specialties of Webster, N.Y.

"VITEL 2700B" is a trade designation for a copolyester resin ($T_g$=47° C., $M_w$=67,000), "VITEL 3550B" is a trade designation for a copolyester resin ($T_g$=–15° C., $M_w$=75,000), "VITEL 7962" is a trade designation for a copolyester resin ($T_g$=–5° C., $M_w$=55,000), "VITEL 7935" is a trade designation for a copolyester resin ($T_g$=–15° C., $M_w$=48,000) and "VITEL 7915" is a trade designation for a copolyester resin ($T_g$=–15° C., $M_w$=44,000), all are available from Bostik Inc. of Middleton, Mass.

"LEXMARK Z11" is a trade designation for a thermal inkjet printer, available from Lexmark International of Lexington, Ky. Ink used with this printer was Lexmark Part No. 12A1980.

The 100 percent cotton T-shirt cloth used in the examples was "HANES SPECIAL-TEE BRAND", 100 percent combed cotton (white), available from Hanes Companies of Winston Salem, N.C. and had a thickness of 0.203 millimeter and basis weight of 104 g/m$^2$.

EPSON II inkjet printer (EPSON Color Stylus II, model #P880A, Cartridge Black, S020047, Color S-20049) is available from EPSON America, Inc. of Long Beach, Calif.

NOVAJET inkjet printer (Encad Novajet 4, model #900, American Inkjet (AIJ) inks) is available from Encad, Inc. of San Diego, Calif. The inks (parts Nos. 201809 (magenta), 201810 (yellow), 201808 (cyan), 201818 (black)) are available from American Inkjet Corporation (AIJ), Billerica, Mass.

"TEXWIPE MP-10" is a trade designation for a silicafilled HDPE, microporous cloth, "TEXWIPE TX-318" is a trade designation for a cotton fabric cloth, "TEXWIPE Alpha 10" is a trade designation for a continuous filament polyester cloth and "TEXWIPE TX-8501" is a trade designation for a cotton/polyester (55/45) cloth, all are available from Texwipe Company of Saddle River, N.J.

Example 1

This example shows the preparation of Compositions 1(a)(comparative) and 1(b)–1(d) according to the invention.

Composition 1(a) (comparative) was prepared by combining with mixing 19.85 parts aluminum sulfophthalate solution (45.36 weight percent solids in water/isopropanol (80:20) solution), 5 parts dihexyl sulfosuccinate sodium salt solution, 1.5 g vinylpyrrolidone/acrylic acid copolymer, 25 parts isopropanol, and 48.66 parts deionized water. The resultant solution was 14.5 weight percent solids.

Composition 1(b) was prepared by combining with mixing 12 parts DISPAL 11N7-12, 2 parts AIRFLEX 465, 12 parts deionized water and 8 parts composition 1(a).

Composition 1(c) was prepared by combining with mixing 12 parts DISPAL 11N7-12, 2 parts AIRFLEX 465, 16 parts deionized water, 8 parts composition 1(a) and 8 parts VIVIPRINT 111.

Composition 1(d) was prepared by combining with mixing 12 parts DISPAL 11N7-12, 2 parts AIRFLEX 465, 20 parts deionized water, 8 parts composition 1(a) and 12 parts VIVIPRINT 111.

Compositions 1(b)–1(d) were each individually coated onto two identical pieces of (15 cm×23 cm) 100 percent cotton fabric (150 thread count, 22.7 g/ft$^2$, 0.0298 g/cm$^2$), one using a #26 Meyer rod and the other a foam-brush to impregnate the substrate with the coating composition resulting in coated substrates S1(b)-1 and S1(b)-2, S1(c)1 and S1(c)-2, S1(d)1 and S1(d)-2. The fabric was impregnated to such an extent so that it felt damp and any excess composition/prep-solution was removed by absorption using a paper towel (approximately coat weights were 19–27 g/m$^2$).

Transfer of an image from an image transfer sheet as described above resulted in a 90–95 percent ink transfer to the substrate.

All of the images transferred were waterfast and had good dye fixation except for the image transferred to Composition 1(a).

Example 2

This example shows the preparation of Compositions 2(a)(comparative) and 2(b)–2(f) according to the invention in which aluminum sulfophthalate in Compositions 1(a)–1(d) was replaced by hydrated aluminum sulfate.

Composition 2(a)(comparative) was prepared by combining with mixing 8.0 Al$_2$(SO$_4$)$_3$.14H$_2$O, 1.7 parts dihexyl sulfosuccinate sodium salt solution, 25 parts isopropanol and 65.3 parts deionized water. The resultant solution was 9.34 weight percent solids.

Composition 2(b) was prepared by combining with mixing 10 parts DISPAL 11N7-12, 2.5 parts AIRFLEX 465, 20 parts deionized water, 10 parts Composition 2(a) and 10 parts VIVIPRINT 111 (hydrophilic binder).

Composition 2(c) was prepared by combining with mixing 15 parts DISPAL 11N7-12, 2.5 parts AIRFLEX 465, 20 parts deionized water, 10 parts Composition 2(a) and 10 parts VIVIPRINT 111.

Composition 2(d) was prepared by combining with mixing 10 parts DISPAL 11N7-12, 2.5 parts AIRFLEX 465, 20 parts deionized water, 10 parts Composition 2(a) and 15 parts VIVIPRINT 111.

Composition 2(e) was prepared by combining with mixing 10 parts DISPAL 11N7-12, 3.5 parts AIRFLEX 465, 20 parts deionized water, 10 parts Composition 2(a) and 10 parts VIVIPRINT 111.

Composition 2(f) was prepared by combining with mixing 10 parts DISPAL 11N7-12, 2.5 parts AIRFLEX 465, 25 parts deionized water, 10 parts Composition 2(a) and 10 parts VIVIPRINT 111.

Compositions 2(a)–2(f) were each individually coated onto two identical pieces of (15 cm×23 cm) 100 percent cotton fabric (150 thread count, 27.7 g/ft$^2$, 0.0298 g/cm$^2$), one using a #26 Meyer rod and the other a foam-brush to impregnate the substrate with the coating composition resulting in coated substrates S2(b)1 and S2(b)2, S2(c)1 and S2(c)2, S2(d)1 and S2(d)2. The fabric was impregnated to such an extent so that it felt damp and any excess composition/prep-solution was removed by absorption using a paper towel (approximately coat weights were 19–27 g/m$^2$).

Transfer of an image from an image transfer sheet as described above resulted in a 90–95 percent ink transfer (average for yellow, magenta, cyan) to the substrate. All of the images transferred were waterfast and had good dye fixation except for the image transferred to Composition 2(a).

Example 3

This example shows the preparation of Compositions 3(a)–3(c).

Composition 3(a)(comparative) was prepared by combining with mixing 10 parts DISPAL 11N7-12, 10 parts Al$_2$(SO$_4$)$_3$.14H$_2$O, 2 parts AIRFLEX 465, 25 parts deionized water and 12 parts VIVIPRINT 111 (as the hydrophilic binder).

Composition 3(b)(comparative) was prepared by combining with mixing 10 parts DISPAL 11N7-12, 10 parts Al$_2$(SO$_4$)$_3$.14H$_2$O, 2 parts AIRFLEX 465, 25 parts deionized water, 8 parts carboxymethylcellulose sodium salt and 12 parts VIVIPRINT 111.

Composition 3(c) was prepared by combining with mixing 10 parts DISPAL 11N7-12, 10 parts Al$_2$(SO$_4$)$_3$.14H$_2$O, 2 parts AIRFLEX 465, 4 parts dihexyl sulfosuccinate sodium salt solution, 4 parts carboxymethylcellulose sodium salt, and 25 parts deionized water and 12 parts VIWIPRINT 111.

Compositions 3(a)(comparative)–3(c) were each individually coated onto two identical pieces of (15 cm×23 cm) 100 percent cotton fabric (150 thread count, 27.7 g/ft$^2$, 0.0298 g/cm$^2$), one using a #26 Meyer rod and the other a foam-brush to impregnate the substrate with the coating composition resulting in coated substrates S3(a)-1 and S3(a)-2, S3(b)1 and S3(b)-2, S3(c)1 and S3(c)-2. The fabric was impregnated to such an extent so that it felt damp and any excess composition/prep-solution was removed by absorption using a paper towel (approximately coat weights were 19–27 g/m$^2$).

Comparative coated substrates S3(a)1-2 showed poor transfer of the black image. Comparative coated substrates S3(b)1-2 showed better transfer of black image. Coated substrates S3(c)1-2 showed little if any intercolor bleed with excellent black transfer.

Example 4

This example shows the preparation of Composition 4 according to the invention.

Composition 4 was prepared by combining with mixing 60 parts DISPAL 11N7-12, 60 parts of a solution of 8 parts Al$_2$(SO$_4$)$_3$ 14H$_2$O and 1.67 parts dihexyl sulfosuccinate sodium salt solution in isopropanol/water (75:25), 12 parts AIRFLEX 460, 20 parts carboxymethylcellulose sodium salt, and 80 parts deionized water and 60 parts VIVIPRINT 111 (as a 10 weight percent solids in water).

Composition 4 was mixed for about 30 minutes with a mechanical stirrer at about 80–100 rpm. The emulsion thus prepared was further milled for about 2 hours using 0.5 inch (1.25 cm) diameter glass-beads to eliminate any small agglomerate formed.

Composition 4 was coated onto two pieces of 100 percent cotton cloth (T-shirt) using an applicator bottle with a foam brush onto it. Excess solution was blotted out using a paper towel. To the damped surface of the cotton cloth, an image printed on an image transfer sheet in using an a HP 855C printer was transferred using hand/finger pressure. There was 96-98 percent colored ink transfer in both cases. Black ink transfer was 40–60 percent.

Coating Composition 4 was also applied in like manner to TEXWIPE TX-318 cotton wiper, a TEXWIPE ALPHA 10 wiper, TEXWIPE TX 8501 cotton/polyester (55/45) wipers and were successfully transferred as above.

Example 5

This example shows ink and image transfer from an imaged transfer medium to a substrate coated with Composition 4.

Composition 4 was coated/applied onto a sheet of another 100 percent cotton fabric (T-shirt cloth) using a foam-brush. Excess solution was blotted up using a paper towel. To the damp surface was transferred a freshly printed image from an image transfer medium printed using a Lexmark Z11 printer. The procedure was reproduced using various desk-top printers. Typically, 93–98 percent transfer of yellow, magenta and cyan colors using different printers was observed. The results are shown in following Table 1.

TABLE 1

| Printer | Percent Ink Transfer | |
|---|---|---|
|  | Colors* | Black |
| HP 855C | 94 | 52 |
| HP 2000 | 93 | 48 |
| LexMark Z11 | 98 | 90 |
| Epson II | 94 | 72 |

*based on average density of the colors yellow, magenta and cyan

Example 6

Composition 4 was applied onto a polished and varnished wooden surface using a foam-brush. Excess solution was blotted up using a paper towel. To the damp surface was transferred a freshly printed image from an imaged transfer sheet printed using an HP 855C desk-top printer. There was 96–98 percent transfer of all color, black transfer was 50–60 percent. An image printed using an imaged transfer medium from a Lexmark Z11 printer, was transferred near-quantitatively to the varnished wooden surface (98–99 percent ink transferred).

This procedure was repeated to transfer an image onto a polished, painted wooden jewelry box. An image printed on an image transfer sheet using a Lexmark Z11 printer was transferred quantitatively to the wooden surface (all color being 98 percent transferred including black). The transfer was nearly flawless and the image quality was very high.

Similar results were obtained on a clean glass, a clean glazed a ceramic tile and painted walls using a freshly printed image from an image transfer sheet printed in an HP 855C desk-top printer. Ink transfer was typically 90–95 percent for combined colors, black ink transfer was 40–60 percent. The transfer was flawless and the image quality was very high.

Example 7

This example shows the use of the ink receptive compositions of the invention for direct imaging processes.

Composition 4 was coated onto a 90 cm×61 cm piece of thin 100 percent cotton fabric (98 g/m² basis weight) using a #26 Meyer rod. The coated fabric was air-dried for 2 hour. The dry fabric was directly imaged in a wide-format inkjet printer (Encad/Novajet) operating on a dye-based ink. Test patterns and images directly printed onto the fabric dried instantaneously and were free from any bleeding, feathering, smudging or any other distortion as judged by eye.

The above procedure was repeated except that an HP 3500 cp wide-format inkjet printer operating on a pigment-based ink. The ink dried instantaneously to provide very high quality and high density images which were nearly completely free from any bleeding, feathering, smudging or distortion as judged by eye.

Example 8

This example shows that ink receptive compositions of the invention are useful on over-head transparency films.

A 28 cm×23 cm polyethylene terephthalate polyester film was coated with Composition 4 using a #26 Meyer rod. The film was dried using a heat-gun and then was imaged in an HP 855C desk-top printer using a dye based ink. High density, high quality images were obtained that were free from any bleeding, feathering and smudging as judged by eye. Image dry time was 2 minutes.

The example was repeated to coat two sheets using a knife-coater for thick coating (6 mil wet). The dry films were printed in a HP 970C and an Epson Color Styllus printer to obtain similar quality images with dry time of 0.75 and 0.5 minutes respectively.

Example 9

A microporous silica-filled polypropylene sheet (TEXWIPE MP-10) was coated with Composition 4 using a Meyer rod #26. A test color image was directly printed with a HP 870C inkjet printer using a dye-based ink. The test image dried instantaneously to give an image without inter-color bleed, good smudge resistances and high image quality.

Similar results were obtained using spunbonded polyethylene/polyester non-woven fabric (ELEVES T0703WDO) that were coated with Composition 4 using a Meyer rod #26 and a knife coater for thicker coating and dried with a heat gun.

Example 10

Composition 5 was prepared as described in Example 4 by combining with mixing 15 parts DISPAL 11N7-12, 10 parts Composition 1(a), 2.5 parts AIRFLEX 460, 25 parts deionized water and 15 parts VIVIPRINT 111 (as a 10 weight percent solids in water).

Composition 5 was coated onto 100 percent cotton fabric using a foam brush. The fabric was impregnated to such an extent so that it felt damp and any excess solution was removed by absorption using a paper towel.

An image from an imaged transfer sheet was transferred to the coated fabric. Ink transfer was 90–98 percent using imaged transfer sheets printed in a HP 855C and Lexmark Z11 desktop printers.

The imaged fabric was coated with a VITEL 2700 solution (15 weight percent in toluene/isopropyl alcohol=85/15) using a paint brush, dried within 1–2 minutes in the air and then left overnight at ambient conditions. Application of the VITEL 2700 coating did not diminish image quality of the imaged fabric. The imaged fabric was washed with water for 1 hour using 300 g water in a 1L beaker with magnetic stirring at 60–70 rpm and dried. Very low loss of any color was observed from the fabric. The color/image density before and after washing is shown in Table 2.

TABLE 2

| | Reflectance Color Density | | | | | | |
|---|---|---|---|---|---|---|---|
| | Green | Red | Blue | Magenta | Cyan | Yellow | Black |
| Before Washing | 1.236 | 1.192 | 1.247 | 1.218 | 1.228 | 1.012 | 0.785 |
| After Washing | 0.948 | 0.969 | 1.090 | 0.993 | 1.169 | 0.895 | 0.538 |

Example 11

A solution was prepared by combining with mixing 8 parts aluminum sulfate hydrate $Al_2(SO_4)_3.15-18\ H_2O$, 1.67 parts AEROSOL MA 80-I, 25 parts isopropanol and 65.3 parts deionized water. Composition 6 was prepared by combining with mixing 15 parts of the above mentioned solution, 15 parts DISPAL 11N7-12, 3 parts AIRFLEX 460, 20 parts deionized water and 15 parts VIVIPRINT 111 (as a 10 weight percent solids in water).

Composition 6 was mixed for about 30 minutes as described in Example 4 using an electrical stirrer.

Composition 6 was coated onto 100 percent cotton fabric and allowed to dry 24 hours as in Example 10. An image from an imaged transfer sheet was transferred to the coated fabric. Ink transfer was 90–96 percent using imaged transfer sheets printed using an HP 855C desktop printer.

The imaged fabric was washed with water for 24 hours using water as described in Example 10 and dried. Very low loss of any color was observed from the fabric. The image was dried at ambient conditions for another 24 hours and its reflectance color density was measured (as shown in Table 3).

TABLE 3

| | Reflectance Color Density | | | | | |
|---|---|---|---|---|---|---|
| | Green | Red | Blue | Magenta | Cyan | Yellow |
| Before Washing | 1.160 | 0.987 | 1.103 | 1.027 | 1.173 | 0.740 |
| After Washing | 0.808 | 0.620 | 0.615 | 0.581 | 0.677 | 0.404 |

Example 12

The procedure of Example 11 was repeated except that the imaged cotton fabric was coated with a 15 percent VITEL 2700 solution using a paint brush. The coating was dried overnight. The imaged fabric was washed with water as described in Example 10 and dried. Very low loss of any color was observed from the fabric. The image was dried at ambient conditions for another 24 hours and its reflectance color density was measured (as shown in Table 4).

TABLE 4

| | Reflectance Color Density | | | | | |
|---|---|---|---|---|---|---|
| | Green | Red | Blue | Magenta | Cyan | Yellow |
| Before Washing | 1.143 | 1.112 | 1.120 | 1.075 | 1.134 | 0.936 |
| After Washing | 0.921 | 0.840 | 0.985 | 0.898 | 0.902 | 0.756 |

Example 13

Composition 6 was coated onto TEXWIPE TX 318, TX 1010 Alpha and TX 8501 wipers, 100 percent cotton T-shirt cloth, 100 percent cotton fine cloth, glazed ceramic tile, polished wood, varnished wood, painted wood, substrates and glass slabs, vases and windows as previously described and an image was applied from an imaged transfer sheet. The transferred images were high quality and in the cases of varnished wood and ceramic tile were similar to direct photo-quality printing.

Example 14

Example 12 was repeated using various polyester resins having different glass transition temperatures. The results are shown in Table 5.

TABLE 5

| Resin | Color Density | | | | | |
|---|---|---|---|---|---|---|
| Used | Green | Red | Blue | Magenta | Cyan | Yellow |
| Before Washing None | 1.160 | 0.987 | 1.103 | 1.027 | 1.173 | 0.740 |
| VITEL 2700 | 1.143 | 1.112 | 1.120 | 1.075 | 1.134 | 0.936 |
| After Washing VITEL 2700 | 0.884 | 0.823 | 0.809 | 0.823 | 0.824 | 0.637 |
| VITEL 3550B | 0.690 | 0.667 | 0.585 | 0.658 | 0.658 | 0.557 |
| VITEL 7962 | 0.795 | 0.759 | 0.821 | 0.750 | 0.695 | 0.695 |
| VITEL 7935 | 0.776 | 0.754 | 0.708 | 0.762 | 0.621 | 0.579 |
| VITEL 7915 | 0.755 | 0.740 | 0.795 | 0.743 | 0.716 | 0.456 |

Various modifications and alterations of this invention will become apparent to those skilled in the art without departing from the scope and spirit of this invention, and it should be understood that this invention is not to be unduly limited to the illustrated embodiments set forth herein.

What is claimed is:

1. An ink receptor medium kit comprising:
    an image transfer medium; and
    an ink receptor composition comprising a mixture of:
        colloidal alumina;
        multivalent metal ion selected from the group consisting of metal ions from group IIA to VIA of the Periodic Table;
        hydrophilic binder that is at least partially soluble or swellable in deionized water;
        hydrophobic latex having a glass transition temperature of from about −60° C. to about 100° C. and a surface having an advancing contact angle with deionized water of greater than about 60 degrees when dried or cured;
        surfactant, wherein said surfactant is non-ionic, cationic, anionic, zwitterionic, or a combination of anionic and non-ionic surfactants; and
        optionally an image transfer aid, in a container.

2. The kit of claim 1 wherein the kit further comprises a substrate to be imaged.

3. The kit of claim 1 further comprising an image storage medium.

4. The kit of claim 1 wherein the image transfer medium is imaged.

5. The kit of claim 1 wherein the multivalent metal ion is selected from the group consisting of ions of aluminum, magnesium, zinc, iron, bismuth, gallium, strontium, calcium, titanium, zirconium, and combinations thereof.

6. The kit of claim 1 wherein the hydrophilic binder is selected from the group consisting of copolymers of vinyl pyrrolidone and acrylates, copolymers of vinyl pyrrolidone and methacrylamides, copolymers of vinyl acetate and vinyl pyrrolidone, copolymers of vinyl acetate and acrylic acid, polyvinyl alcohols, acrylic acid homo- and co-polymers, acrylamide homo- and co-polymers, cellulosic polymers, copolymers of styrene and allyl alcohol, copolymers of styrene and acrylic acid, copolymers of styrene and maleic acid, alkylene oxide polymers and copolymers, gelatins, and polysaccharides.

7. The kit of claim 1 wherein the hydrophobic latex is selected from the group consisting of copolymers of butyl acrylate, copolymers of ethyl acrylate, copolymers of acrylic acid, copolymers of methacrylic acid, copolymers of methyl methacrylate, copolymers of acrylonitrile, copolymers of styrene, copolymers of N-methylolacrylamide, polyurethanes, polyesters, polyamides, and combinations thereof.

8. The kit of claim 1 wherein the surfactant is selected from the group consisting of fluorochemical, silicone and hydrocarbon based surfactants, and combinations thereof.

9. The kit of claim 1 wherein the optional image transfer aid is present and is selected from the group consisting of cellulosic polymers.

10. The kit of claim 1 wherein the multivalent metal ion is present in the form of salt wherein the salt is a salt of sulfuric, nitric, hydrochloric, sulfonic carboxylic acids phenols, and hydroxy acids, and combinations thereof.

11. The kit of claim 1 wherein multivalent metal ion is present in the form of a salt and the salt is selected from the group consisting of aluminum sulfate, aluminum nitrate, aluminum sulfophthalate, aluminum sulfoisophthalate, and combinations thereof.

12. The kit of claim 1 wherein the hydrophilic binder is a copolymer of vinyl pyrrolidone and methacrylamide.

13. The kit of claim 1 wherein the hydrophobic latex is selected from the group consisting of acrylate latexes, vinyl acetate/ethylene latexes, and combinations thereof.

14. The kit of claim 1 wherein the colloidal alumina is water dispersible, organic solvent dispersible or acid dispersible.

15. The kit of claim 1 wherein the surfactant is anionic, non-ionic, or a combination thereof.

16. An ink receptor medium kit comprising:
(a) an ink receptor composition comprising a mixture of:
colloidal alumina;
multivalent metal ion selected from the group consisting of metal ions from group IIA to VIA of the Periodic Table;
hydrophilic binder that is at least partially soluble or swellable in deionized water;
hydrophobic latex having a glass transition temperature of from about −60° C. to about 100° C. and a surface having an advancing contact angle with deionized water of greater than about 60 degrees when dried or cured;
surfactant, wherein said surfactant is non-ionic, cationic, anionic, zwitterionic, or a combination of anionic and non-ionic surfactants; and
optionally an image transfer aid; and
(b) an image storage medium.

17. The kit of claim 16 wherein the multivalent metal ion is selected from the group consisting of ions of aluminum, magnesium, zinc, iron, bismuth, gallium, strontium, calcium, titanium, zirconium, and combinations thereof.

18. The kit of claim 16 wherein the hydrophilic binder is selected from the group consisting of copolymers of vinyl pyrrolidone and acrylates, copolymers of vinyl pyrrolidone and methacrylamides, copolymers of vinyl acetate and vinyl pyrrolidone, copolymers of vinyl acetate and acrylic acid, polyvinyl alcohols, acrylic acid homo- and co-polymers, acrylamide homo- and co-polymers, cellulosic polymers, copolymers of styrene and allyl alcohol, copolymers of styrene and acrylic acid, copolymers of styrene and maleic acid, alkylene oxide polymers and copolymers, gelatins, and polysaccharides.

19. The kit of claim 16 wherein the hydrophobic latex is selected from the group consisting of copolymers of butyl acrylate, copolymers of ethyl acrylate, copolymers of acrylic acid, copolymers of methacrylic acid, copolymers of methyl methacrylate, copolymers of acrylonitrile, copolymers of styrene, copolymers of N-methylolacrylamide, polyurethanes, polyesters, polyamides, and combinations thereof.

20. The kit of claim 16 wherein the surfactant is selected from the group consisting of fluorochemical, silicone and hydrocarbon based surfactants, and combinations thereof.

\* \* \* \* \*

UNITED STATES PATENT AND TRADEMARK OFFICE
CERTIFICATE OF CORRECTION

| | |
|---|---|
| PATENT NO. | : 6,841,208 B2 |
| APPLICATION NO. | : 10/347812 |
| DATED | : January 11, 2005 |
| INVENTOR(S) | : Omar Farooq |

It is certified that error appears in the above-identified patent and that said Letters Patent is hereby corrected as shown below:

Column 10,
Line 41, delete "comer" and insert in place thereof -- corner --.
Line 43, delete "Ser. No." and insert in place thereof -- Ser. Nos. --.

Column 18,
Line 23, delete "VIWIPRINT" and insert in place thereof -- VIVIPRINT --.

Signed and Sealed this

Twenty-seventh Day of March, 2007

JON W. DUDAS
*Director of the United States Patent and Trademark Office*